United States Patent
Sivonen et al.

(10) Patent No.: US 8,526,907 B2
(45) Date of Patent: Sep. 3, 2013

(54) POWER CONSUMPTION REDUCTION TECHNIQUE FOR INTEGRATED WIRELESS RADIO RECEIVER FRONT-ENDS

(75) Inventors: Pete Sivonen, Raisio (FI); Jarkko Jussila, Turku (FI)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/307,767

(22) Filed: Nov. 30, 2011

(65) Prior Publication Data

US 2013/0137386 A1 May 30, 2013

(51) Int. Cl.
- H04B 1/16 (2006.01)
- H04B 1/06 (2006.01)
- H04B 7/00 (2006.01)
- H04B 3/18 (2006.01)
- H03F 3/12 (2006.01)

(52) U.S. Cl.
USPC ............... 455/343.1; 455/234.1; 455/293; 330/61 A (58) Field of Classification Search
USPC ............. 455/232.1, 234.1, 280, 293, 343.1; 330/61 A
See application file for complete search history.

(56) References Cited

U.S. PATENT DOCUMENTS

| | | | |
|---|---|---|---|
| 7,286,809 B2 | 10/2007 | Friesen et al. | |
| 2003/0086383 A1 | 5/2003 | Bremer et al. | |
| 2006/0145762 A1 | 7/2006 | Leete | |
| 2009/0257533 A1 | 10/2009 | Lindoff et al. | |
| 2010/0007424 A1* | 1/2010 | Savla et al. | 330/302 |
| 2010/0156538 A1 | 6/2010 | Ogasawara | |
| 2011/0065403 A1 | 3/2011 | Muhammad et al. | |
| 2012/0077446 A1* | 3/2012 | Kahrizi et al. | 455/73 |

FOREIGN PATENT DOCUMENTS

WO 0173958 A1 10/2001

OTHER PUBLICATIONS

R. Bagheri et al.; "An 800-MHz-6-GHz Software-Defined Wireless Receiver in 90-nm CMOS", IEEE Journal of Solid-State Circuits, vol. 41, No. 12; pp. 2860-2876, Dec. 2006.
Z. Ru et al.; "Digitally Enhanced Software-Drfined Radio Receiver Robust to Out-of-Band Interference", IEEE Journal of Solid-State Circuits, vol. 44, No. 12; pp. 3359-3375, Dec. 2009.
Asgaran, S., et al., A Novel Gain Boosting Technique for Design of Low Power Narrow-Band RFCMOS LNAs, Analog & Mixed Signal Design, Poster Session IV, 2004, pp. 293-296.
Heiberg, Adam C., et al., A 250 mV, 352 µW GPS Receiver RF Front-End in 130 nm CMOS, IEEE Journal of Solid-State Circuits, Apr. 2011, pp. 938-949, vol. 46, No. 4.
B. Razavi, "RF Microelectronics," Nov. 16, 1997, pp. 170-173, Chapter 6, and 227-230, Chapter 7, Prentice Hall, Inc., USA.

* cited by examiner

*Primary Examiner* — Nguyen Vo
(74) *Attorney, Agent, or Firm* — Coats & Bennett, P.L.L.C.

(57) ABSTRACT

The method and apparatus disclosed herein reduces the power consumption of a wireless transceiver by reducing the power consumption associated with the corresponding wireless receiver. Generally, a power mode selection unit enables or disables a low power mode based on a dynamic range requirement for the receiver. More particularly, when the dynamic range requirement is less than or equal to a threshold, the power mode selection unit lowers the transconductance of an RF front-end amplifier in the receiver and enables a negative resistance at an output of the RF front-end amplifier. When enabled, the negative resistance compensates for the gain lost by lowering the transconductance of the RF front-end amplifier, which enables the front-end gain associated with the low-power mode to be maintained relative front-end gain associated with the normal mode.

23 Claims, 7 Drawing Sheets

POWER CONSUMPTION REDUCTION TECHNIQUE FOR INTEGRATED WIRELESS RADIO RECEIVER FRONT-ENDS

The invention disclosed herein generally relates to the power consumption of wireless devices, and more particularly relates to reducing the power consumption of a wireless receiver in a wireless device.

BACKGROUND

Power consumption represents one of the most important design considerations for a wireless device. From the user's perspective, low power consumption desirably increases battery life.

Wireless transceivers employed in modern wireless devices, e.g., cellular telephones, personal data assistants, smart phones, etc., are typically highly integrated, where most of the transceiver functions are integrated on a radio frequency integrated circuit (RFIC). A highly integrated RFIC reduces the wireless device's printed circuit board (PCB) area, complexity, and power consumption, while lowering the component cost.

Even when the wireless device uses a highly integrated transceiver RFIC, there is still a desire to reduce the power consumption of the transceiver operations. For example, one of the most power-hungry circuits of a receiver is the receiver front-end, which generally includes a front-end amplifier and mixer. Thus, one way to reduce the overall power consumption of the transceiver is to reduce the power consumption of the receiver front-end.

SUMMARY

The method and apparatus disclosed herein reduces the power consumption of a wireless transceiver by reducing the power consumption associated with the corresponding receiver front-end. Generally, a power mode selection unit enables or disables a low power mode based on a dynamic range requirement for a receiver. More particularly, when the dynamic range requirement is less than or equal to a threshold, the power mode selection unit reduces the power consumption by lowering the equivalent transconductance of an RF front-end amplifier in the receiver, and enables a negative resistance at an output of the RF front-end amplifier. When enabled, the negative resistance compensates for the gain lost by lowering the equivalent transconductance of the RF front-end amplifier, which enables the gain of the RF front-end amplifier associated with the low-power mode to be maintained relative to the corresponding gain associated with the normal mode.

One exemplary embodiment provides a method of controlling power consumption of a transceiver comprising a transmitter and a receiver. The method comprises determining a dynamic range requirement for the receiver, where the receiver includes an RF front-end amplifier having an adjustable transconductance, and enabling or disabling a low power mode based on the dynamic range requirement. More particularly, the method comprises enabling the low power mode when the dynamic range requirement is less than or equal to a first threshold by lowering the equivalent transconductance of the RF front-end amplifier and enabling a negative resistor unit operatively connected to an output of the RF front-end amplifier to apply a negative resistance to the output of the RF front-end amplifier. When the dynamic range requirement exceeds the first threshold, the method comprises disabling the low power mode by increasing the equivalent transconductance of the RF front-end amplifier (or maintaining it at a normal level) and disabling the negative resistance unit.

An exemplary wireless receiver in a transceiver configured to selectively control the power consumption of the transceiver comprises a controller, an RF front-end amplifier having an adjustable transconductance, a negative resistor unit, and a power mode selection unit. The controller is configured to determine a dynamic range requirement for the receiver. The negative resistor unit is operatively connected to an output of the RF front-end amplifier. The power mode selection unit is configured to enable or disable the low power mode. More particularly, when the dynamic range requirement is less than or equal to a first threshold, the power mode selection unit enables the low power mode by lowering the equivalent transconductance of the RF front-end amplifier and enabling the negative resistor unit to apply a negative resistance to the output of the RF front-end amplifier. When the dynamic range requirements exceed the first threshold, the power mode selection unit disables the low power mode by increasing the equivalent transconductance of the RF front-end amplifier (or maintaining it at a normal level) and disabling the negative resistance unit.

DETAILED DESCRIPTION

Figure 1:
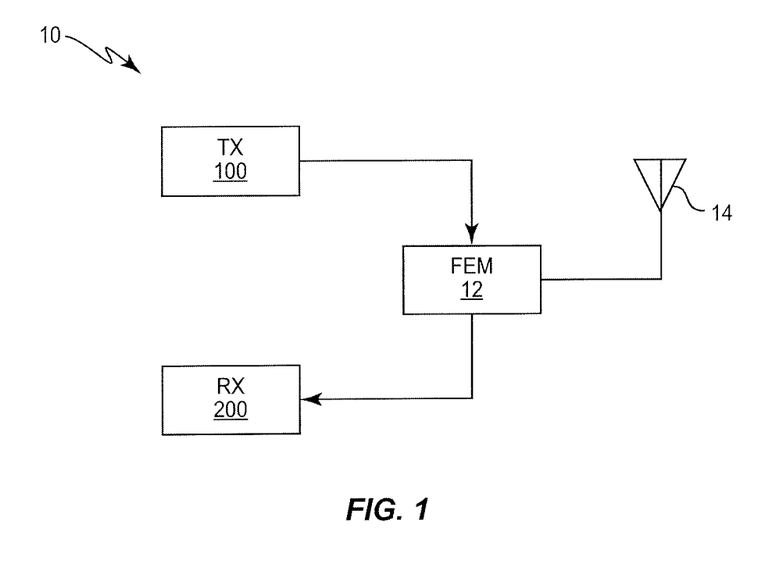
FIG. 1 depicts a block diagram of a wireless transceiver.

FIG. 1 depicts a general block diagram of a wireless transceiver 10 comprising a transmitter 100, a receiver 200, a front-end module 12, and an antenna 14. Front-end module 12 comprises any appropriate switch, isolation unit, duplexer, etc., that enables the transmitter 100 and receiver 200 to use the same antenna 14. In addition, front-end module 12 may include a pre-selection filter (not-shown) that performs the pre-selection of the received RF band. Transmitter 100 transmits signals to a remote wireless network/device via antenna 14. Receiver 200 receives signals from the remote wireless network/device via antenna 14. Transceiver 10 may be used in any wireless device that wirelessly transmits/receives signals according to any known wireless standard/protocol.

Figure 2:
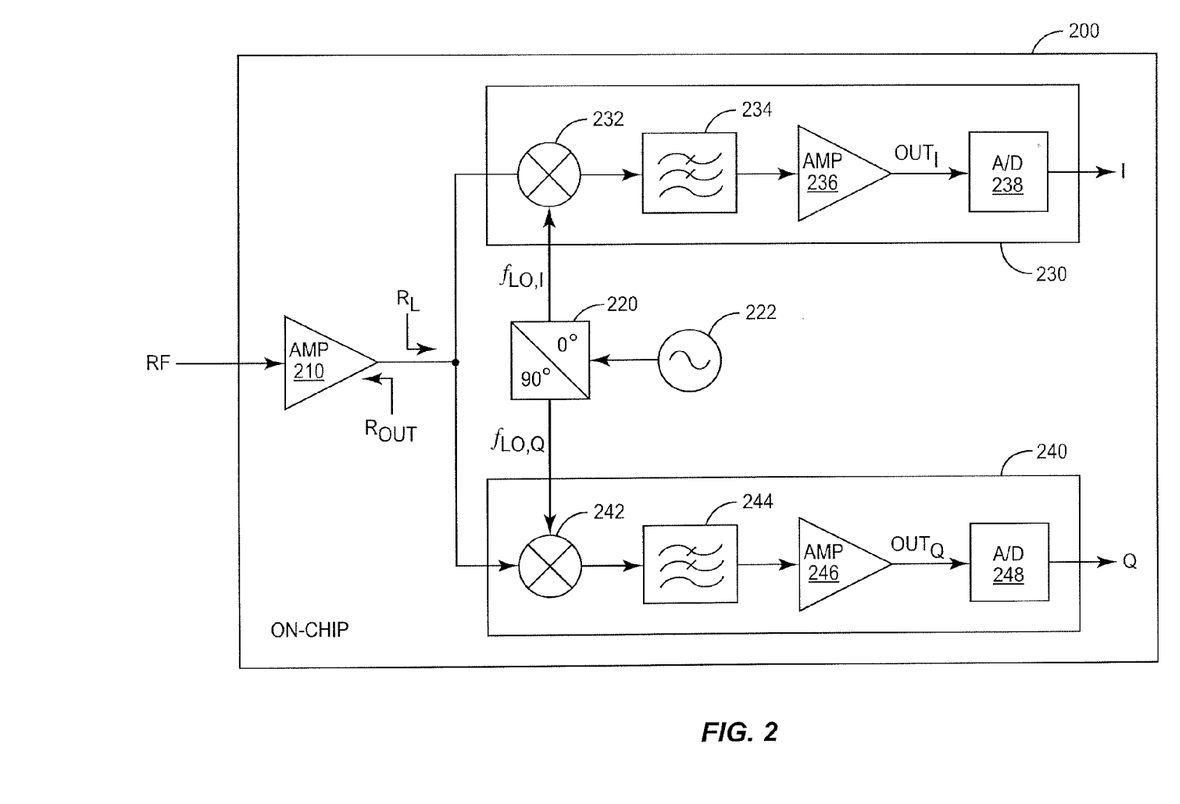
FIG. 2 depicts a general block diagram of a receiver of the wireless transceiver of FIG. 1.

FIG. 2 depicts an exemplary receiver 200 for the wireless transceiver 10 of FIG. 1. Receiver 200 amplifies and down-converts the input signal to generate an analog baseband signal, which is subsequently filtered and converted to a digital signal.

Receiver 200 comprises a front-end amplifier 210 operating at RF, an In-phase processing chain 230, a Quadrature processing chain 240, a phase shift unit 220, and a local oscillator 222. RF front-end amplifier 210, which may comprise a low noise amplifier (LNA) operating at RF, amplifies the input RF signal for further processing in the In-phase and Quadrature processing chains 230, 240. Amplifier 210 may be realized using any known implementation, including but not limited to, an inductively-degenerated common-source amplifier, resistively-feedback amplifier, etc. Local oscillator 222 outputs a local oscillator signal to phase shift unit 220, which generates Quadrature phases for the local oscillator signals of the Quadrature and In-phase processing chains such that $f_{LO,Q}$ provided to the Quadrature processing chain 240 is 90° out-of-phase with $f_{LO,I}$ provided to the In-phase processing chain 230. In-phase processing chain 230 processes the amplified RF signal to generate a digital In-phase signal I, e.g., at baseband output. Quadrature processing chain 240 processes the amplified RF signal to generate a digital Quadrature signal Q, e.g., at baseband output.

In-phase processing chain 230 comprises a mixer 232, filter 234, baseband amplifier 236, and analog-to-digital converter 238. Mixer 232 mixes the input RF signal with $f_{LO,I}$ to downconvert the input RF signal to a desired frequency, e.g., an intermediate frequency (IF) or baseband. Low-pass filter 234 filters the downconverted signal. Baseband amplifier 236 amplifies the filtered signal to generate an amplified In-phase output signal $OUT_I$. In some embodiments, baseband filter 234 comprises a transimpedance amplifier (TIA) that uses operational amplifiers at analog baseband to realize a virtual ground at the mixer output and to provide blocker filtering, which may improve the linearity of mixer 232. Further, it will be appreciated that in some embodiments, the filter 234 and amplifier 236 may be implemented as part of a single unit that comprises both the filter 234 and the baseband amplifier 236. Analog-to-digital converter 238 converts $OUT_I$ to a digital signal I.

Quadrature processing chain 240 comprises a mixer 242, filter 244, baseband amplifier 246, and analog-to-digital converter 248. Mixer 242 mixes the input RF signal with $L_{LO,Q}$ to downconvert the input RF signal to a desired frequency, e.g., an IF or baseband. Low-pass filter 244 filters the downconverted signal. Baseband amplifier 246 amplifies the filtered signal to generate an amplified Quadrature output signal $OUT_Q$. In some embodiments, baseband filter 244 comprises a transimpedance amplifier (TIA) that use operational amplifiers at analog baseband to realize a virtual ground at the mixer output and to provide blocker filtering, which may improve the linearity of mixer 242. Further, it will be appreciated that in some embodiments, the filter 234 and amplifier 236 may be implemented as part of a single unit that comprises both the filter 234 and baseband amplifier 236. Analog-to-digital converter 238 converts $OUT_Q$ to a digital signal Q.

Because the RF front-end amplifier 210 is generally preceded by the pre-selection filter in most receivers 200, the RF input impedance of amplifier 210 should be designed to match the characteristic impedance of the filter, e.g., 50Ω (or 100Ω for differential). Further, the input-referred noise, and thus the noise figure (NF), of the RF front-end amplifier 210 and therefore of the receiver 200, should be sufficiently low to enable the receiver 200 to detect weak input signals. Low NF is particularly useful when the receiver 200 operates at the receiver's sensitivity level, such as when the receiver 200 operates far from the transmitting node. Moreover, the gain at the output of RF front-end amplifier 210, e.g., the voltage gain or the voltage-to-current gain, should be sufficiently high to overcome the noise contributions of the subsequent components, which may otherwise degrade the receiver sensitivity. The voltage-to-current gain at the output of RF front-end amplifier 210 may be expressed according to:

$$\frac{I_{OUT}}{V_{IN}} = \frac{R_{OUT}}{R_{OUT} + R_L} g_m = \frac{G_L}{G_L + G_{OUT}} g_m, \quad (1)$$

where $R_{OUT}$ represents output impedance of the RF front-end amplifier 210 as seen from the output of the amplifier 210, $G_{OUT}=1/R_{OUT}$, $R_L$ represents the amplifier load resistance and input impedance to the processing chains 230, 240, $G_L=1/R_L$, and $g_m$, represents the equivalent transconductance of the RF front-end amplifier 210. Here $I_{OUT}$ represents the RF signal current driven to load resistor $R_L$, and $V_{IN}$ represents the amplifier RF-input voltage. Further, the RF front-end amplifier 210 should have sufficient linearity to prevent the intermodulation products of a strong interferer from overwhelming the weak desired signal. High amplifier linearity is particularly important when the transmitter 100 transmits at a high power, e.g., the maximum power, when the receiver 200 receives a weak RF input signal.

In practice, the requirements for the dynamic range of the RF front-end amplifier 210, which are set by the noise and linearity performance, determine the power consumption of the RF front-end amplifier 210, and therefore, affect the power consumption of the receiver 200. Thus, if the RF front-end amplifier 210 requires a high linearity and a low noise figure, the power consumption of the RF front-end amplifier 210 will be proportionally higher than when the RF front-end amplifier 210 is allowed to have lower linearity and/or a higher noise figure. In reality, the RF front-end amplifier 210 has requirements for the high linearity and low noise figure only during certain operating times and under certain conditions, e.g., when the transmitter 100 transmits at full power, which e.g., may occur up to 50% of the time. For example, the linearity and/or noise requirements may be relaxed when the distance between the wireless device and a remote network node/device is small, and/or when the transmitter 100 is not transmitting or only transmits at a low power. As another example, when the received RF signal is larger than the sensitivity level of the receiver 200, higher noise contributions from the receiver 200 can be tolerated and the gain of amplifier 210 may be decreased, which may significantly reduce the receiver power consumption. For example, if the noise performance requirements of the receiver 200 may be even slightly relaxed, e.g., by 0.5 dB, the power consumption of the RF front-end amplifier 210 may be lowered by several milliamps (or tens of percentage points). This is because if the noise figure of amplifier 210 may be increased, the input referred noise of the amplifier 210 may be increased, and in practice, the equivalent transconductance ($g_m$) of the amplifier 210 can be lowered, which in practice usually proportionally reduce the power consumption of the amplifier 210, and therefore, of the receiver 200.

Unfortunately, decreasing the equivalent transconductance of the RF front-end amplifier 210 necessarily decreases the gain of the amplifier 210 when all other factors remain the same. Such a gain reduction increases the noise contributions of the subsequent downstream circuits too much, and therefore, makes such an implementation impractical.

Figure 3:
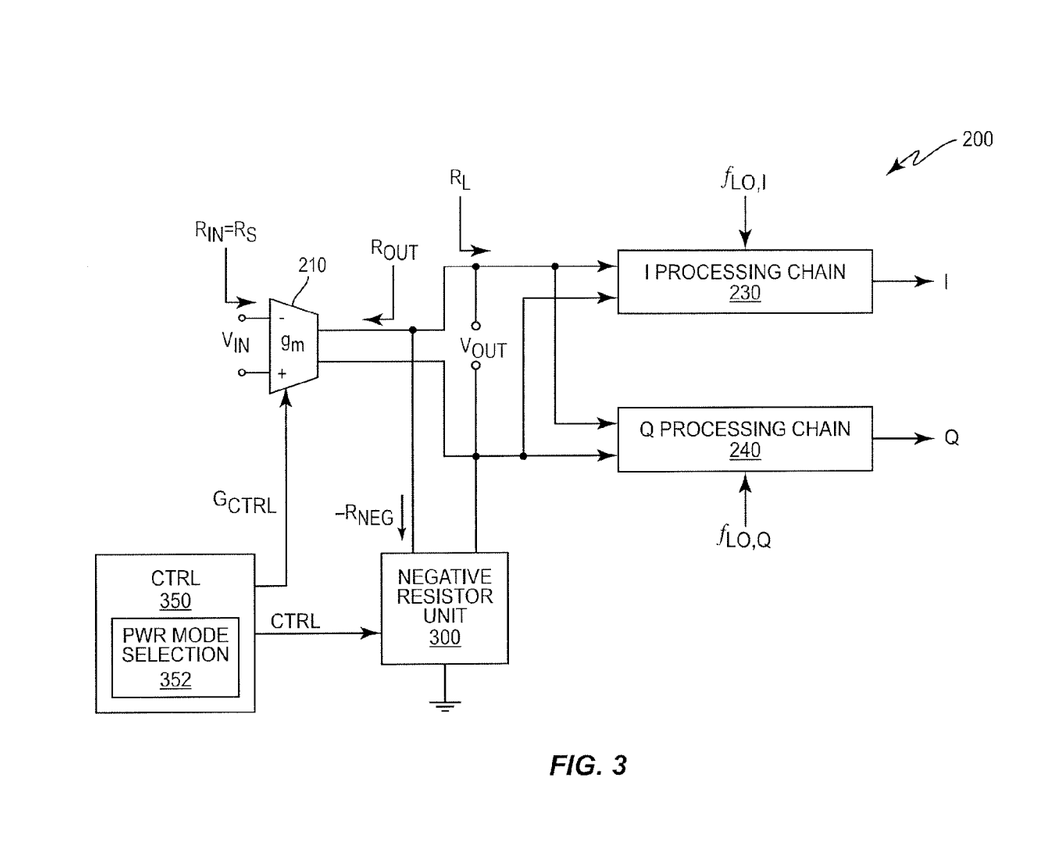
FIG. 3 depicts a circuit diagram for a receiver according to one exemplary embodiment.

The solution disclosed herein addresses this problematic trade-off by providing a method and apparatus that maintains the gain at the output of the RF front-end amplifier 210 even when the equivalent transconductance of the amplifier 210 has been decreased. FIG. 3 depicts a receiver 200 according to one exemplary embodiment, where a negative resistor unit 300 is operatively connected to the RF front-end amplifier 210, and a controller 350 and a corresponding power mode selection unit 352 control the operation of the front-end amplifier 210 and the negative resistor unit 300 to enable/disable a low power mode. While the figures depict that the negative resistor unit 300 connects directly to the output of the front-end amplifier 210 and/or to a common node connecting the processing chains 230, 240, it will be appreciated that such a direct connection is not required. The negative resistor unit 300 may be connected to other parts of the amplifier 210, and/or other components may be disposed between the negative resistor unit 300 and the amplifier and/or processing chains 230, 240. The controller 350 and power selection unit 352 may be implemented using any known processing circuitry, including but not limited to, a field programmable gate array (FPGA), an application specific integrated circuit (ASIC), etc., and may be implemented on the same integrated circuit as the receiver 200. While FIG. 3 depicts the power mode selection unit 352 as part of the controller 350, it will be appreciated that the controller 350 and power selection unit 352 may be implemented as separate entities. Further, while the figures discussed herein show a negative resistor unit connected between the output of amplifier 210 and ground, those skilled in the art will appreciate that the negative resistor unit 300 may connect to the output of amplifier 210 in any number of ways, including but not limited to, between the amplifier output and a power source, and in parallel with differential outputs.

Figure 4:
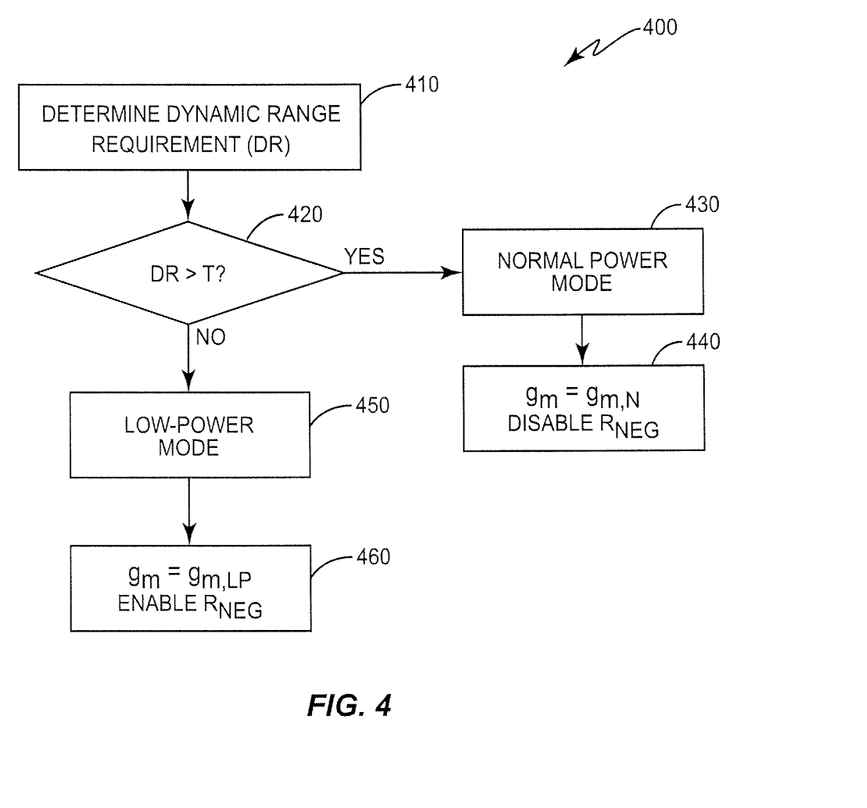
FIG. 4 depicts a flow chart for a power reduction method according to one exemplary embodiment.

FIG. 4 depicts an exemplary method 400 for controlling the power mode of the receiver 200. First, controller 350 determines the dynamic range requirements (DR) for the receiver 200 (block 410). For example, the controller 350 may compare a received signal power to a receiver sensitivity level, and determine the dynamic range requirement based on the comparison. Alternatively or additionally, the controller 350 may determine the dynamic range requirement based on a transmission power level of the transmitter, or may measure the power of one or more blocking signals, and determine the dynamic range requirement based on the measured blocking signal power. Subsequently, power mode selection unit 352 determines whether the dynamic range requirements exceed a threshold T (block 420). When the dynamic range requirements exceed the threshold, the power mode selection unit 352 disables the low power mode/maintains the normal power mode (block 430) by setting the equivalent transconductance of the front end amplifier 210 to $g_m$ via control signal $G_{ctrl}$ and disabling the negative resistor unit 300 via control signal CTRL (block 440). When the dynamic range requirements are less than or equal to the threshold, the power mode selection unit 352 places the receiver 200 in a low power mode (block 450) by reducing the equivalent transconductance to $g_{m,LP}$ via control signal $G_{ctrl}$ and enabling the negative resistor unit 300 via control signal CTRL such that the resistance looking into the negative resistor unit 300 is negative (block 460). By selectively enabling the negative resistance $R_{NEG}$ of the negative resistor unit 300 during the low power mode, the receiver 200 achieves the desired low power consumption associated with the lower equivalent transconductance without decreasing the gain of the amplifier 210, and therefore, without sacrificing the overall receiver gain.

The ability of the negative resistor unit 300 to enable the RF front-end amplifier 210 to maintain the desired gain during the low power mode is described below. In the low power mode, the equivalent transconductance $g_m$ of the amplifier 210 is lowered to $g_{m,LP}$. In this case, the voltage-to-current gain at the output of the RF front-end amplifier 210 may be expressed as:

$$\frac{I_{OUT}}{V_{IN}} = \frac{G_L}{G_L + G_{OUT} - G_{NEG}} g_{m,LP}, \quad (2)$$

where $G_{NEG}=1/R_{NEG}$. Per Equation (2), when $g_m$ is lowered to $g_{m,LP}$ during the low power mode, the voltage-to-current gain may be maintained by appropriately choosing the resistance value of the negative resistor unit 300. For example, the voltage-to-current gain may be maintained during the low power mode if the negative resistance $R_{NEG}$ is chosen according to:

$$R_{NEG} = \frac{R_L R_{OUT}}{R_L + R_{OUT}} \cdot \frac{g_m}{g_m - g_{m,LP}}. \quad (3)$$

Equation (3) assumes $R_{OUT}$ is the same for both the normal power mode and the low power mode. It will be appreciated that such is not required, and that Equation (3) may be modified accordingly to account for variations in $R_{OUT}$.

Figure 5:
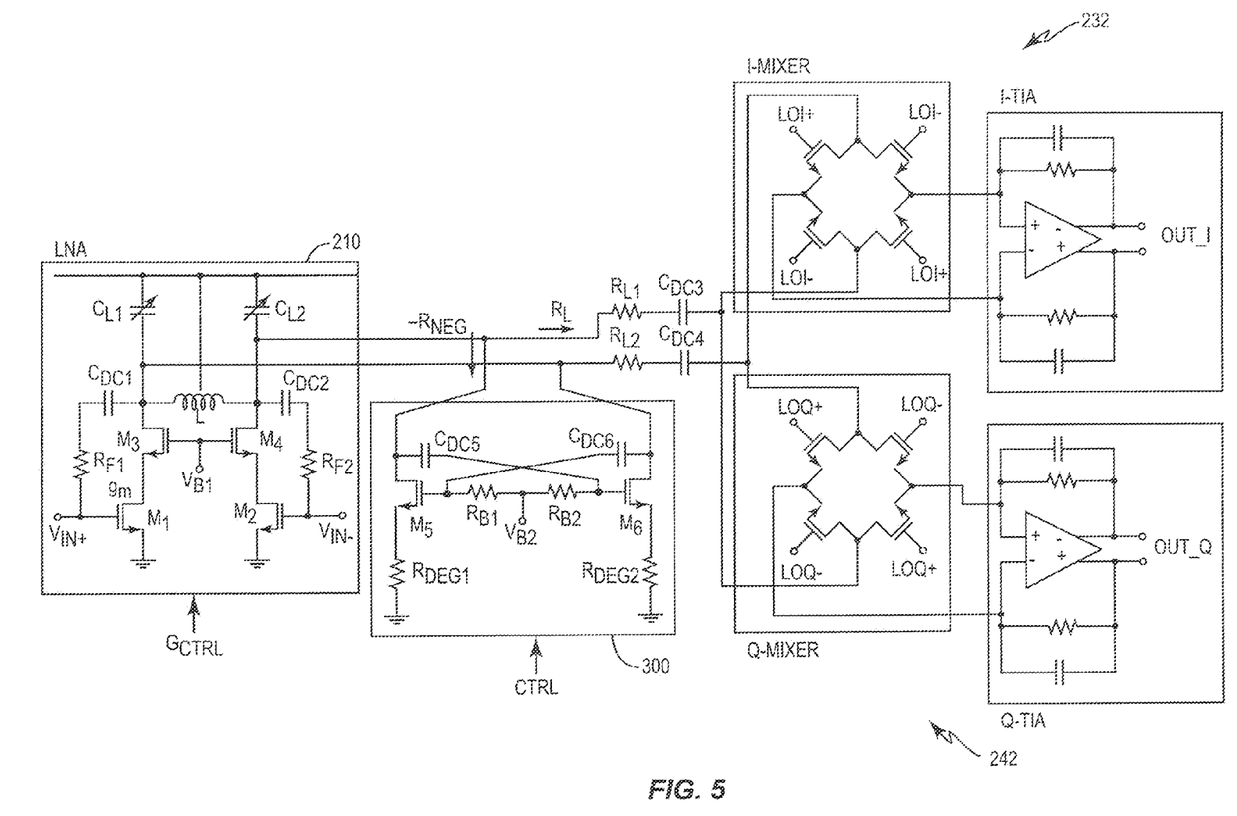
FIG. 5 depicts circuit details for portions of the receiver, including a negative resistor unit, for one exemplary embodiment.

FIG. 5 depicts circuit details for an exemplary RF front-end of the receiver 200, including exemplary circuit details for the negative resistor unit 300. In this embodiment, RF front-end amplifier 210 comprises a differential resistive-feedback low-noise amplifier (LNA) with a resonator load. The amplifier 210 is designed such that at the frequency of interest, the differential load inductor resonates with the capacitance presented at the LNA output. While the previous discussion focused on the equivalent transconductance of the front-end amplifier 210, the following describes the invention in terms of the effect of the transconductance of the amplifier transistor(s) and the transistors of an exemplary negative resistor unit on the amplifier gain.

The LNA output comprises a differential output that couples to the I and Q mixers 232, 242 via resistors $R_{L1}$ and $R_{L2}$ and capacitors $C_{DC3}$ and $C_{DC4}$, where $R_{L1}$ and $R_{L2}$ realize the desired LNA amplifier voltage swing. In this example, each of the I and Q mixers 232, 242 comprise a current-mode double-balanced passive mixer, where transimpedance amplifiers (TIA) employ operational amplifiers at analog baseband to realize a virtual ground at the mixer output and to provide block filtering. As a result, nonlinearities due to mixer switches are minimized and mixer linearity is improved. Further, capacitors $C_{DC1}$-$C_{DC6}$ associated with the RF front-end amplifier 210 and negative resistor unit 300 have a small impedance at the operating radio frequency, and therefore, operate as DC-blocking capacitors, while capacitors $C_{L1}$ and $C_{L2}$ represent the capacitor tuning matrix at the LNA load, and $R_{F1}$ and $R_{F2}$ represent amplifier feed-back resistors. Transistors $M_1$ and $M_2$ provide the actual amplification for LNA 210, while transistors $M_3$ and $M_4$ operate as cascode transistors.

The negative resistor unit 300 of FIG. 5 comprises a cross-coupled common-source transistor stage ($M_5$, $M_6$) with resistive degeneration ($R_{DEG1}$, $R_{DEG2}$) to improve linearity. In this embodiment, the negative resistance is derived based on the transconductance of $M_5$ and $M_6$ and the resistances of the $R_{DEG1}$ and $R_{DEG2}$. It will be appreciated, however, that $R_{DEG1}$ and $R_{DEG2}$ are optional; when omitted the negative resistance is derived based on the transconductance of $M_5$ and $M_6$. Resistors $R_{B1}$ and $R_{B2}$ comprise bias resistors set to a large value at the frequency of operation. In FIG. 5, $V_{B1}$ and $V_{B2}$ represent bias voltages for the LNA 210 and negative resistor unit 300, respectively, where $V_{B2}$ is coupled to the gates of the transistors $M_5$, $M_6$ so as to enable/disable the negative resistor unit 300. For example, the negative resistor unit 300 may be enabled by setting the bias voltage $V_{B2}$ to a value greater than a threshold, and may be disabled by setting the bias voltage to a value less than the threshold, e.g., 0 V. While FIG. 5 shows an embodiment using a bias voltage to enable/disable the negative resistor unit 300, those skilled in the art will appreciate that any type of bias signal, e.g., a bias current, etc., could be used to enable/disable the negative resistor unit 300.

When enabled, the negative resistance of the negative resistor unit 300 of FIG. 5 may be approximated as:

$$-R_{NEG} = -\left(\frac{1}{g_{m5}} + R_{DEG}\right) \approx -R_{DEG}, \quad (4)$$

where $g_{m5}$ represents the transconductance of transistor $M_5$, $R_{DEG}$ represents the value of degeneration resistance ($R_{DEG}=R_{DEG1}=R_{DEG2}$), and the approximation holds if $g_{m5}R_{DEG}\gg 1$. In the normal mode, which provides sufficient linearity and low noise figure, the negative resistor unit 300 is disabled, e.g., by setting $V_{B2}=0$ V. In this case, the LNA input resistance $R_{IN}$ may be represented by:

$$R_{IN} = \frac{G_L + G_F}{(g_{m1} + G_L)G_F}, \quad (5)$$

where $G_L=1/R_L$, $R_L$ represents the resistance looking at the LNA output into the mixer 230, 240, $R_F$ represents the feedback resistance of the LNA 210 ($R_F=R_{F1}=R_{F2}$), $G_F=1/R_F$, and $g_{m1}$ represents the transconductance of transistor $M_1$. It will be appreciated that $g_{m1}$ is interchangeable with $g_{m2}$ for Equation (5) and the subsequent equations, where $g_{m2}$ represents the transconductance of transistor $M_2$. The LNA input resistance $R_{IN}$ preferably matches the resistance of the preceding duplex filter 210 or source resistance $R_S$, which is typically 50Ω. The resulting LNA voltage-to-current gain for the normal mode may be represented by:

$$\frac{I_{OUT}}{V_{IN}} = \frac{(G_F - g_{m1})G_L}{G_L + G_F} \approx \frac{-g_{m1}G_L}{G_L + G_F}, \quad (6)$$

where $I_{OUT}$ represents the RF signal current driven to the mixer switches (e.g., via $R_{L1}$ and $R_{L2}$), $V_{IN}$ represents the differential LNA RF-input voltage, and the approximation is valid when $g_{m1}\gg G_F$.

In the low-power mode, which may be used when the noise and/or linearity requirements may be relaxed, the negative resistor unit 300 is enabled, e.g., by setting $V_{B2}$ equal to some suitable, non-zero value, and the transconductance of transistor $M_1$ is lowered from $g_{m1}$ to $g_{m1,LP}$. In this case, then LNA input resistance $R_{IN}$ may be represented by:

$$R_{IN} = \frac{G_L + G_F - G_{NEG}}{(g_{m1,LP} + G_L - G_{NEG})G_F} \quad (7)$$

where $G_{NEG}=1/R_{NEG}$. Comparing Equation (7) to Equation (5) shows that an appropriately selected value for $G_{NEG}=1/R_{NEG}$ will compensate for the lower transconductance $g_{m1,LP}$ in the low-power mode. For example, Equation (8) represents the conductance of the negative resistor unit 300 that will compensate for the lower LNA transconductance.

$$G_{NEG} = \frac{(G_L + G_F)(g_{m1} - g_{m1,LP})}{(g_{m1} - G_F)}. \quad (8)$$

The resulting LNA voltage-to-current gain for the low-power mode may be represented by:

$$\frac{I_{OUT}}{V_{IN}} = \frac{(G_F - g_{m1,LP})G_L}{G_L + G_F - G_{NEG}} \approx \frac{-g_{m1,LP}G_L}{G_L + G_F - G_{NEG}}, \quad (9)$$

where the approximation is valid when $g_{m1,LP}\gg G_F$. Substituting Equation (8) into Equation (9) shows that by choosing the value for $G_{NEG}$ given by Equation (8), the low-power mode voltage-to-current gain given by Equation (9) is the same as the voltage-to-current gain achieved in the normal mode. As a result, the negative resistor unit 300 enables the power consumption to be reduced during the low-power mode without degrading the gain of the RF front-end amplifier 210.

Table 1 shows an exemplary simulated performance for the embodiment shown in FIG. 5 for both the normal and low-power modes. The simulation was performed at 2.2 GHz with a 1.2 V supply voltage using 40 nm CMOS technology and according to 3G or WCDMA standards.

TABLE 1

| Parameter | Normal Mode | Low-Power Mode |
|---|---|---|
| Voltage Gain | 48.5 dB | 48.6 dB |
| Noise Figure (NF) | 2.3 dB | 2.7 dB |
| Half-Duplex IIP3 | +3.3 dBm | −5.7 dBm |
| LNA + $R_{NEG}$ current consumption | 16.6 mA | 9.4 mA |

As shown in Table 1, the RF front-end NF is approximately 2.3 dB and the half duplex IIP3 is approximately +3.3 dBm. The 2.3 dB NF is typically sufficient for WCDMA sensitivity tests, and the 3.3 dBm IIP3 is typically large enough relative to the maximum transmit power leakage. Moreover, the RF front-end voltage gain is approximately 48.5 dB in the normal mode, which is sufficient to minimize the noise due to the rest of the receiver circuitry. In the low-power mode, however, while the voltage gain stays roughly the same, the NF increases by 0.4 dB to 2.7 dB and the IIP3 reduces to −5.7 dB. The higher noise figure can be tolerated as long as receiver 200 operates at least slightly above the sensitivity level. Further, the lower IIP3 can also be tolerated as long as the transmitter 100 is not transmitting at maximum power. Most importantly, the current consumption decreases significantly from 16.6 mA (normal mode) to 9.4 mA (low-power mode), which represents approximately a 40% savings. Thus, the simulation confirms that the power consumption of the receiver 200 may be significantly reduced during a low-power mode without sacrificing the receiver performance in that low-power mode. It will be appreciated that similar results may be achieved by receivers 200 using other implementations for the amplifier 210, negative resistor unit 300, and processing chains 230, 240.

Figure 6:
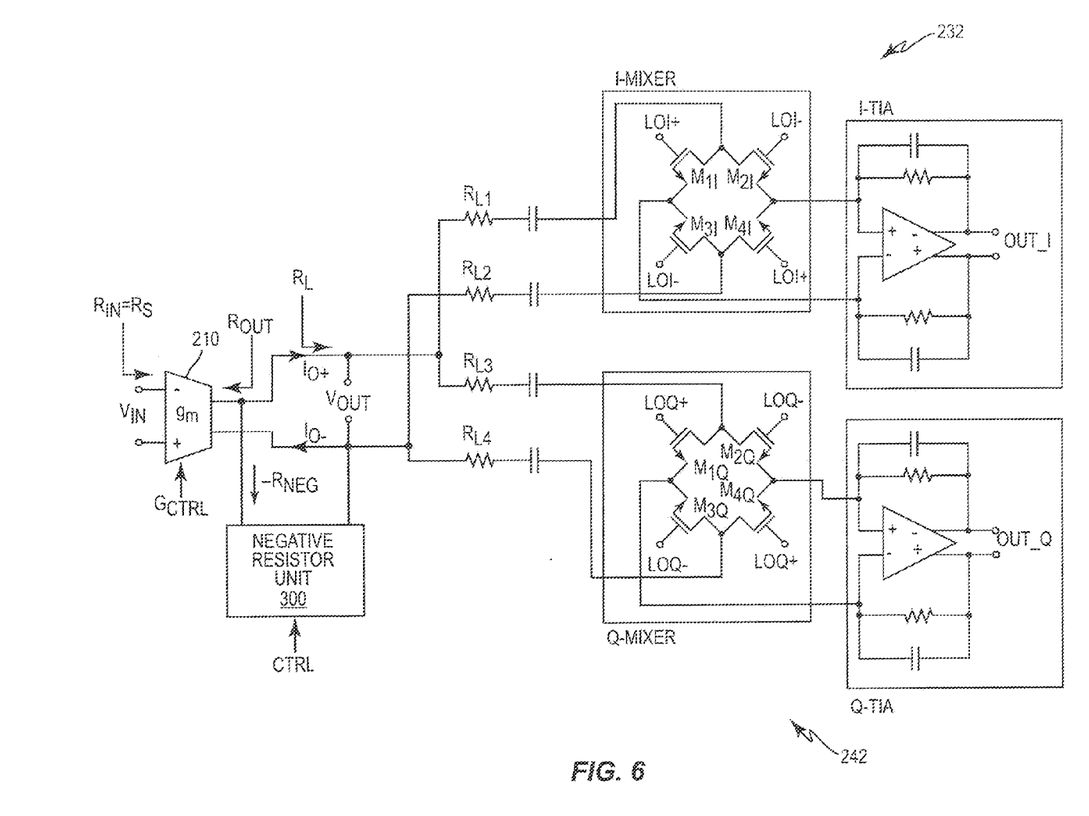
FIG. 6 depicts circuit details for portions of another exemplary receiver.
Figure 7:
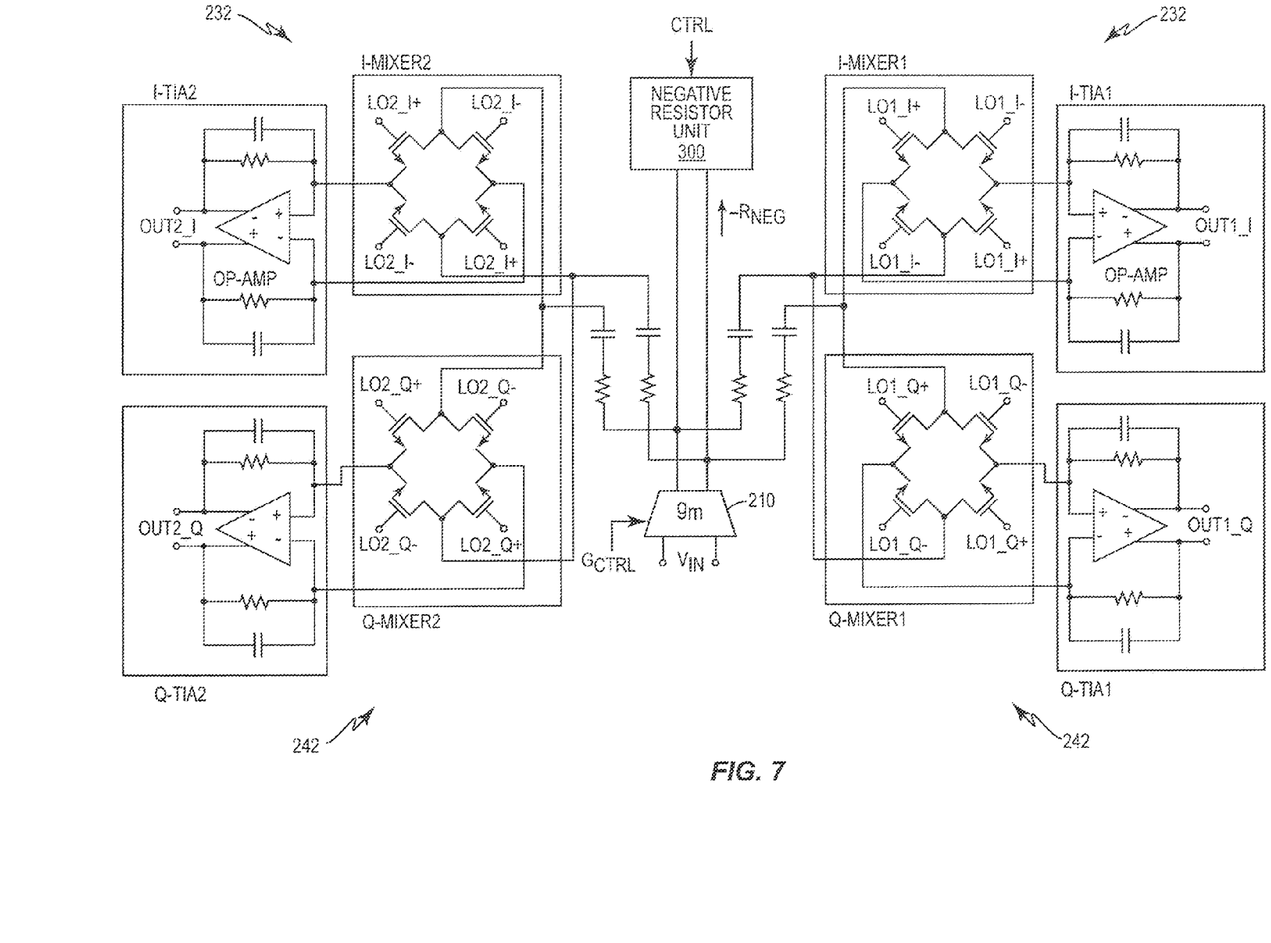
FIG. 7 depicts circuit details for portions of another exemplary receiver.

FIGS. 6 and 7 show alternative receiver front-end embodiments. In FIGS. 6 and 7, the I/Q signal split occurs before the load resistors $R_{L1}$-$R_{L4}$. Thus, the embodiments in FIGS. 6 and 7 have four resistors, which realize the LNA output voltage swing and isolate the mixers 232, 242. Further, the embodiment in FIG. 7 shows specific circuit details for an exemplary intra-band carrier aggregation RF front-end for the receiver 200, where the LNA 210 drives two pairs of I- and Q-mixers clocked with two oscillator signals, LO1 and LO2, at different frequencies. It will be appreciated that the embodiments shown in FIGS. 5-7 each provides the same general performance discussed herein.

The proposed solution is described in terms of a differential solution that uses a differential RF front-end amplifier 210 and CMOS technology. It will be appreciated, however, that the proposed solution may also be employed with single-ended signal processing and/or other technologies, including but no limited to BJT, BiCMOS, GAS, etc.

The embodiments disclosed herein may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling power consumption of a transceiver comprising a transmitter and a receiver, the method comprising:
    determining a dynamic range requirement for a wireless receiver, said receiver comprising a front-end amplifier having an adjustable transconductance and operating at one or more radio frequencies;
    enabling a low power mode when the dynamic range requirement is less than or equal to a first threshold by lowering the transconductance of the front-end amplifier and enabling a negative resistor unit operatively connected to an output of the front-end amplifier; and
    disabling the low power mode when the dynamic range requirement exceeds the first threshold by increasing the transconductance of the front-end amplifier and disabling the negative resistance unit.

2. The method of claim 1 further comprising comparing a received signal power to a receiver sensitivity level, wherein determining the dynamic range requirement comprises determining the dynamic range requirement based on the comparison.

3. The method of claim 2 further comprising measuring a power of one or more blocking signals, wherein determining the dynamic range requirement further comprises determining the dynamic range requirement based on the measured power of the one or more blocking signals.

4. The method of claim 2 wherein determining the dynamic range requirement further comprises determining the dynamic range requirement based on a transmission power level of the transmitter.

5. The method of claim 1 wherein enabling the negative resistor unit comprises setting a bias controlling the negative resistor unit to a first value greater than a second threshold.

6. The method of claim 5 wherein disabling the negative resistor unit comprises setting the bias to a second value less than the second threshold.

7. The method of claim 6 wherein the second value is zero.

8. The method of claim 1 further comprising setting a negative resistance of the negative resistor unit based on the lowered transconductance of the front-end amplifier during the low power mode such that the negative resistance generally compensates for lost amplifier gain during the low power mode relative to the amplifier gain achieved during the normal power mode.

9. The method of claim 1 wherein enabling the low power mode reduces the power consumption of the receiver while generally maintaining a gain at the output of the front-end amplifier.

10. A wireless receiver in a transceiver configured to selectively control the power consumption of the transceiver, the receiver comprising:
    a controller configured to determine a dynamic range requirement for the receiver;
    a front-end amplifier having an adjustable transconductance and operating at one or more radio frequencies;
    a negative resistor unit operatively connected to an output of the front-end amplifier; and
    a power mode selection unit configured to:
        enable a low power mode when the dynamic range requirement is less than or equal to a first threshold by lowering the transconductance of the front-end amplifier and enabling the negative resistor unit to apply a negative resistance at the output of the front-end amplifier; and
        disable the low power mode when the dynamic range requirements exceed the first threshold by increasing the transconductance of the front-end amplifier and disabling the negative resistance unit.

11. The receiver of claim 10 wherein the controller is further configured to compare a received signal power to a receiver sensitivity level, and determine the current dynamic range requirement based on the comparison.

12. The receiver of claim 11 wherein the controller is further configured to measure a power of one or more blocking signals, and to determine the dynamic range requirement based on the measured power of the one or more blocking signals.

13. The receiver of claim 11 wherein the controller is further configured to determine the dynamic range requirement based on a transmission power level of the transmitter.

14. The receiver of claim 10 wherein the negative resistor unit comprises cross-coupled common-source transistors, each having a transconductance, and each controlled by a bias input to each gate of the common source transistors, and wherein the negative resistance of the enabled negative resistor unit is derived based on the transconductances of the common-source transistors.

15. The receiver of claim 14 wherein the negative resistor unit further comprises one or more degeneration resistors coupled to the source of each transistor, wherein the negative resistance of the enabled resistor unit is further derived based on the resistances of the one or more degeneration resistors.

16. The receiver of claim 14 wherein the power mode selection unit is configured to enable the negative resistor unit by setting the bias to a first value greater than a second threshold.

17. The receiver of claim 16 wherein the power mode selection unit is configured to disable the negative resistor unit by setting the bias to a second value less than the second threshold.

18. The receiver of claim 17 wherein the second value is zero.

19. The receiver of claim 10 wherein the power mode selection unit enables the low power mode to reduce the power consumption of the receiver while generally maintaining a gain at the output of the front-end amplifier.

20. The receiver of claim 10 wherein the front-end amplifier comprises a low-noise amplifier.

21. The receiver of claim 20 wherein the low-noise amplifier comprises an inductively-degenerated common-source low-noise amplifier.

22. The receiver of claim 20 wherein the low-noise amplifier comprises a resistive-feedback low-noise amplifier.

23. The receiver of claim 10 wherein the receiver is configured for intra-band carrier aggregation.

* * * * *